I. B. CONKLIN.
Dumping-Wagon.
No. 41,604.  Patented Feb 16, 1864.
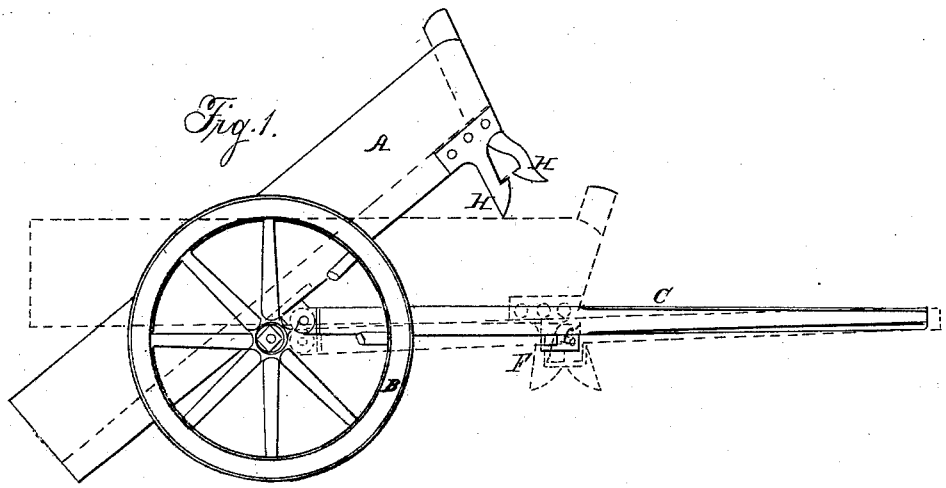
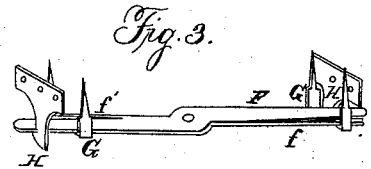
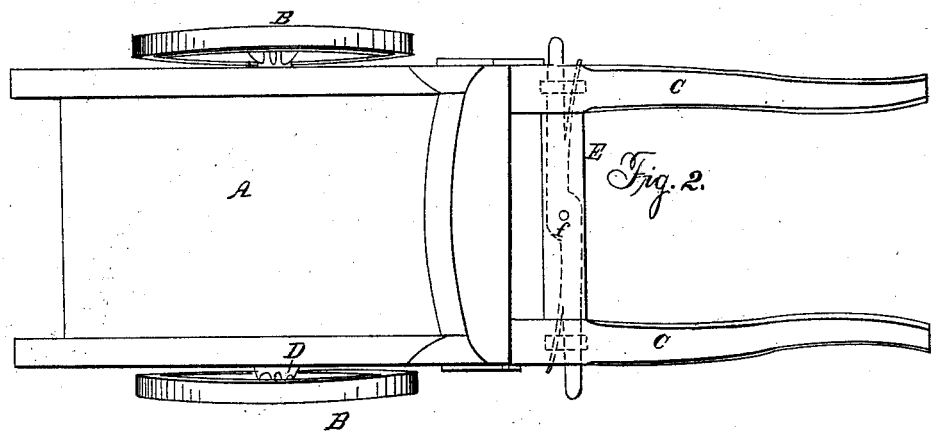
Witnesses:
Charles D. Smith
J. Schultm
Inventor:
J. B. Conklin
per Munn & Co
attys

UNITED STATES PATENT OFFICE.

ISAIAH B. CONKLIN, OF PEMBERTON, NEW JERSEY.

IMPROVEMENT IN DUMPING CARTS OR WAGONS.

Specification forming part of Letters Patent No. 41,604, dated February 10, 1864.

*To all whom it may concern:*

Be it known that I, ISAIAH B. CONKLIN, of Pemberton, in the county of Burlington and State of New Jersey, have invented a certain new and useful Improvement in Dumping Carts or Wagons; and I do hereby declare the following to be a full and exact description of the same, reference being had to the accompanying drawings, making part of this specification, in which—

Figure 1 is a side elevation of a cart embodying my invention, said cart being represented in a dumped position. Fig. 2 is a plan or top view of the same. Fig. 3 is a detached perspective view of the locking device.

Similar letters of reference indicate corresponding parts in the several views.

The object of this invention is to produce a device for facilitating the locking and unlocking of the bodies of dumping carts, wagons, &c.; and it consists in the use of a pivoted bar of peculiar construction, which is held in its normal position by springs, to be hereinafter described, and employed in connection with suitable catches attached to the cart-body and adapted to automatically secure the latter, when restored to its working position, after dumping the load, all as will be hereinafter explained.

In order that others skilled in the art to which my invention appertains may be enabled to fully understand and use the same, I will proceed to describe its construction and operation.

In the accompanying drawings, A may represent the body, B B the wheels, and C C the thills or shafts, of a common dumping-cart. D represents the axle upon which the wheels are mounted and upon which the body of the cart is rigidly secured, and upon the arms of which it turns within the wheels while the cart is being dumped, said axle being located in such position with relation to the length of the body of the cart that the latter may be readily turned back for the purpose of dumping its contents. The front portion of the body A rests upon the shafts C C, which terminate at rear at a point in close proximity with the axle D, where they may be hinged either to the box A or axle D in customary manner.

E represents a transverse bar secured to the shafts C C.

F represents a bar pivoted on the under side of the bar E by a pin or bolt, $f$. At each end the bar F is provided with a spring, $f'$, which springs are situated on opposite sides of said bar and with the latter are confined within metallic straps or brackets G in such manner that the springs $f'$ will force each end of the bar F over a catch, H, secured upon each side of the body A, when the said body A is turned down, so that its front portion will rest upon the shafts C C, whereby said body is securely locked in its normal position. It will be seen that by this arrangement the person in charge of the cart or wagon is enabled to unlock the bar F by merely pressing back or drawing forward one of the ends thereof from its catch H, as by so doing the opposite end will also be released. When the body A is turned down to its working position, the springs $f'$ will allow the bar F to yield, so as to permit the passage of the beveled catches H H, and then press the ends of the bar over the catches, whereby the body is automatically and securely locked.

The springs $f'$ may be of any desired construction, formed in one piece with the bar F, or made separately.

I am aware that in Letters Patent granted, on the 5th of February, 1861, to N. R. Baldwin, a pivoted bar resembling mine is employed to retract a pair of spring-catches which, when released from said bar, return to their normal position ready to catch and lock the body of the cart.

In my invention, instead of spring-catches, I employ stationary hooks, and instead of the pivoted bar being attached to the body, and acting upon the hooks to retract them, the said bar is pivoted to the shafts, is itself provided with springs, and engages directly with the stationary hooks, thus constituting the attachment with which the hooks engage.

My invention is superior to that of Baldwin in cheapness and simplicity of construction, certainty and effectiveness of operation, and durability.

Having thus described my invention, what I claim as new, and desire to secure by Letters Patent, is—

The bar F, pivoted to the shafts C, and controlled by springs $f'$ and staples G, when used in combination with hooks H H, rigidly attached to the cart-body A, all as herein shown and described, and for the purposes specified.

The above specification of my new and useful improvement in dumping carts or wagons signed this 20th day of November, 1863.

ISAIAH B. CONKLIN.

Witnesses:
S. J. KELLY,
SAM. P. GIBBS.